United States Patent
Dutta et al.

(10) Patent No.: US 8,250,063 B2
(45) Date of Patent: *Aug. 21, 2012

(54) RESTRICTING A FAN-OUT SEARCH IN A PEER-TO-PEER NETWORK BASED ON ACCESSIBILITY OF NODES

(75) Inventors: Rabindranath Dutta, Austin, TX (US); Steven Michael French, Austin, TX (US); Janani Janakiraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 906 days.

This patent is subject to a terminal disclaimer.

(21) Appl. No.: 12/244,518

(22) Filed: Oct. 2, 2008

(65) Prior Publication Data

US 2009/0063476 A1     Mar. 5, 2009

Related U.S. Application Data

(63) Continuation of application No. 11/106,341, filed on Apr. 14, 2005, now Pat. No. 7,451,141.

(51) Int. Cl.
*G06F 17/30* (2006.01)
(52) U.S. Cl. .................................................. 707/716
(58) Field of Classification Search .......... 709/227–229; 707/759, 760, 765–788, 705–721, 620–624, 707/740–747
See application file for complete search history.

(56) References Cited

U.S. PATENT DOCUMENTS

| 5,237,662 | A | * | 8/1993 | Green et al. | 718/100 |
|---|---|---|---|---|---|
| 5,602,918 | A | | 2/1997 | Chen et al. | |
| 5,944,823 | A | | 8/1999 | Jade et al. | |
| 5,968,176 | A | | 10/1999 | Nessett et al. | |
| 5,991,764 | A | | 11/1999 | Sundaresan | |
| 6,078,990 | A | * | 6/2000 | Frazier | 711/114 |
| 6,081,812 | A | * | 6/2000 | Boggs et al. | 1/1 |
| 6,085,166 | A | * | 7/2000 | Beckhardt et al. | 705/7.18 |
| 6,101,541 | A | | 8/2000 | Ellesson et al. | |
| 6,134,662 | A | | 10/2000 | Levy et al. | |
| 6,212,633 | B1 | | 4/2001 | Levy et al. | |
| 6,219,706 | B1 | | 4/2001 | Fan et al. | |
| 6,339,772 | B1 | | 1/2002 | Klein et al. | |

(Continued)

FOREIGN PATENT DOCUMENTS

WO     00/42760     7/2000

OTHER PUBLICATIONS

Pancucci, "Friend or Foe? Firewalls and Virtual Private Networks", Unix & NT News, No. 140, pp. 54-56, Feb. 2001, Abstract.

(Continued)

*Primary Examiner* — Wilson Lee
(74) *Attorney, Agent, or Firm* — Yee & Associates, P.C.; Jeffrey S. LaBaw

(57) ABSTRACT

A method, apparatus, and computer implemented instructions for restricting a fan-out type search of a distributed database. A search request is received indicating that a requesting node originating the search request desires to avoid receiving search results including inaccessible nodes. Responsive to receiving the search results from other nodes, the search results are filtered to remove search results from inaccessible nodes to form filtered search results. The filtered search results are passed to the requesting node.

12 Claims, 5 Drawing Sheets

U.S. PATENT DOCUMENTS

| | | | |
|---|---|---|---|
| 6,453,313 B1 * | 9/2002 | Klein et al. ............................ | 1/1 |
| 6,609,121 B1 | 8/2003 | Ambrosini et al. | |
| 6,631,496 B1 | 10/2003 | Li et al. | |
| 6,748,374 B1 | 6/2004 | Madan et al. | |
| 6,816,857 B1 | 11/2004 | Weissman et al. | |
| 6,889,095 B1 * | 5/2005 | Eidson et al. .................. | 700/12 |
| 7,003,514 B2 | 2/2006 | Dutta et al. | |
| 7,130,895 B2 | 10/2006 | Zintel et al. | |
| 7,171,415 B2 | 1/2007 | Kan et al. | |
| 7,249,155 B1 * | 7/2007 | Pestoni ......................... | 709/203 |
| 2002/0073075 A1 * | 6/2002 | Dutta et al. ....................... | 707/3 |
| 2002/0073204 A1 * | 6/2002 | Dutta et al. .................. | 709/227 |
| 2002/0095399 A1 * | 7/2002 | Devine et al. ...................... | 707/1 |
| 2002/0107022 A1 * | 8/2002 | Muniere ...................... | 455/439 |
| 2002/0138471 A1 * | 9/2002 | Dutta et al. ....................... | 707/3 |
| 2003/0050980 A1 * | 3/2003 | Dutta et al. ................... | 709/205 |
| 2003/0067912 A1 | 4/2003 | Mead et al. | |
| 2004/0030694 A1 | 2/2004 | Tokumo et al. | |
| 2004/0122958 A1 * | 6/2004 | Wardrop ....................... | 709/229 |
| 2005/0091202 A1 * | 4/2005 | Thomas ............................ | 707/3 |
| 2005/0165750 A1 * | 7/2005 | Shakib et al. ..................... | 707/3 |

OTHER PUBLICATIONS

Palensky et al., "Security Considerations for FAN-Internet Connections", 2000 IEEE International Workshop on Factory Communication Systems. Proceedings (Cat. No. 00TH8531), pp. 27-35, Published; Piscataway, NJ, USA, 2000, xvi+351 pp., Abstract.

Kubota et al., "An Implementation and Evaluation of Security Gateway for Mobile IP System", Transactions of the Information Processing Society of Japan, vol. 41, No. 3, pp. 792-798, Mar. 2000, Abstract.

Sato et al., "Searching Restricted Documents in a Cooperation Search Engine", Distributed Computing Systems Workshops, 200 Proceedings, 24th International Conference, Mar. 2004, pp. 44-49.

* cited by examiner

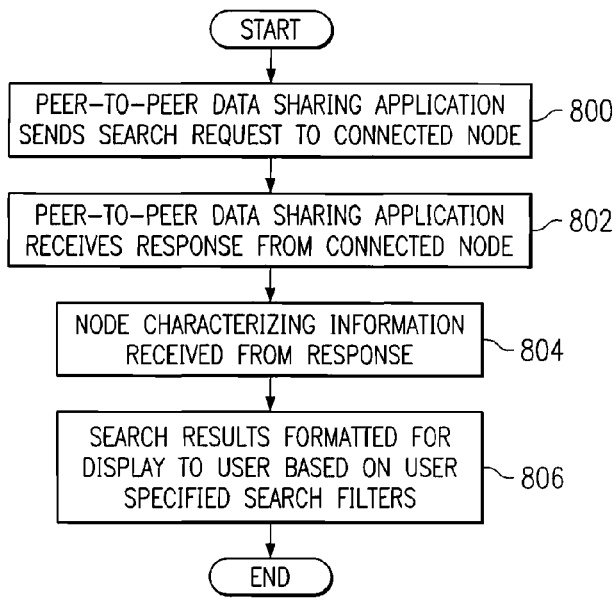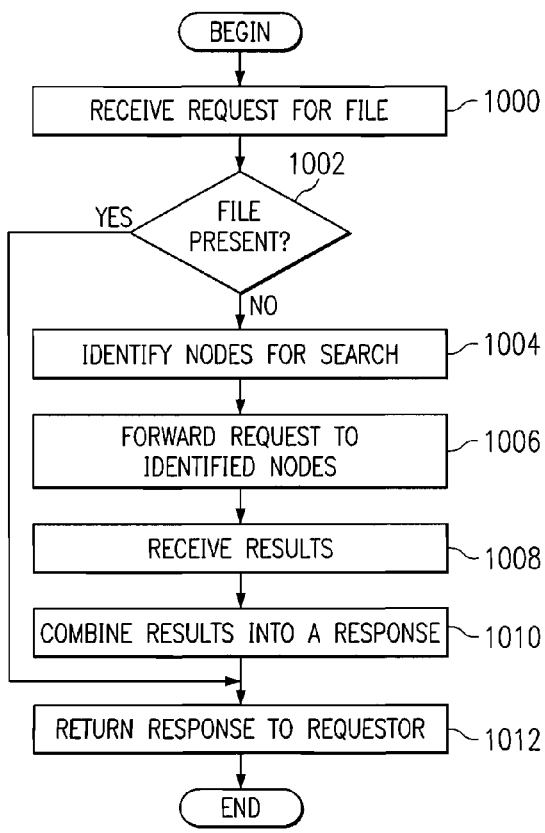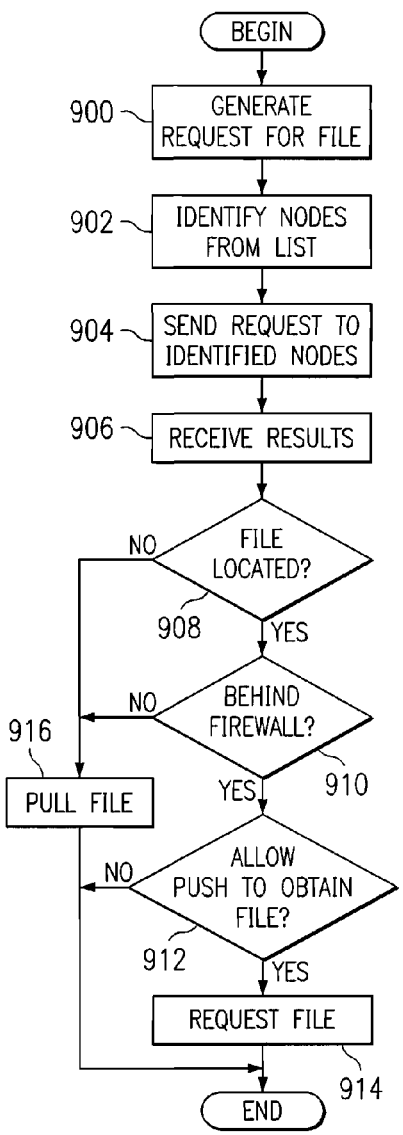

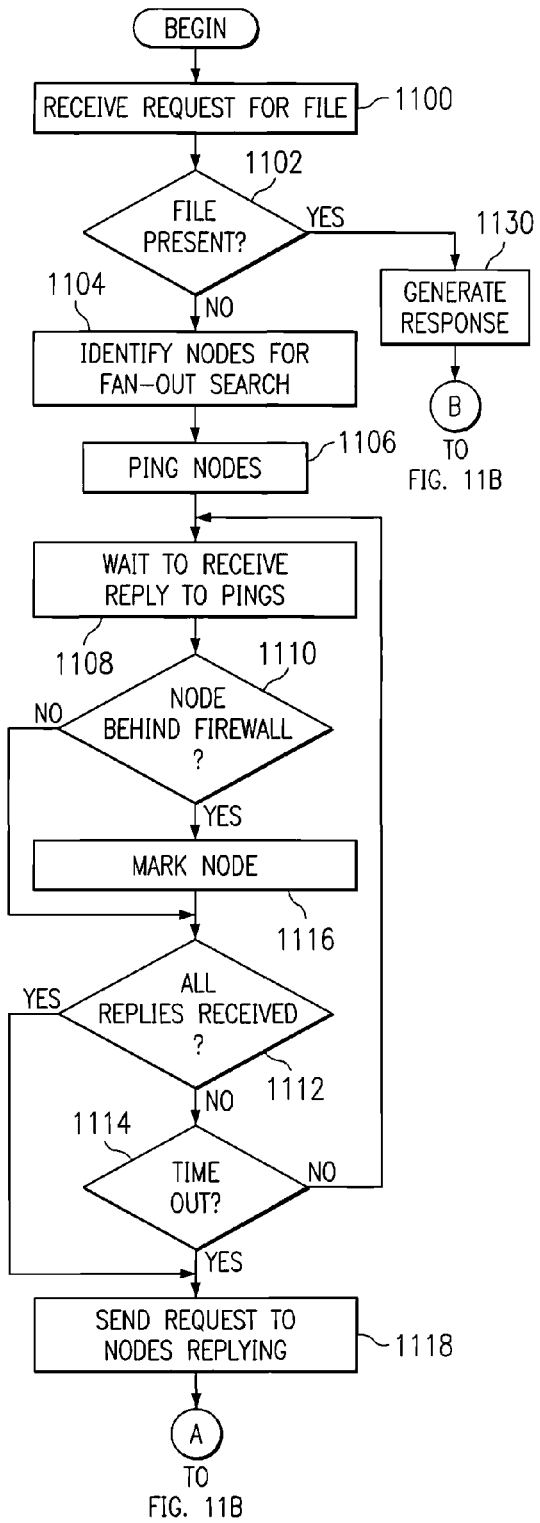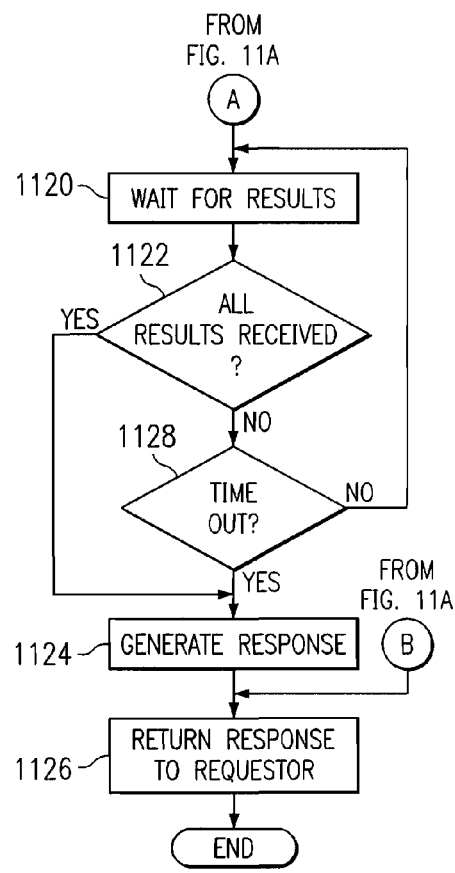

RESTRICTING A FAN-OUT SEARCH IN A PEER-TO-PEER NETWORK BASED ON ACCESSIBILITY OF NODES

CROSS-REFERENCE TO RELATED APPLICATION(S)

This application is a continuation of application Ser. No. 11/106,341, filed Apr. 14, 2005 and entitled "Method and Apparatus for Restricting a Fan-Out Search in a Peer-to-Peer Network Based on Accessibility of Nodes, issued as U.S. Pat. No. 7,451,141 on Nov. 11, 2008.

BACKGROUND OF THE INVENTION

1. Technical Field

The present invention relates to an improved data processing system and, in particular, to a method and system for multi-computer data transferring. Still more particularly, the present invention provides a method, apparatus, and computer implemented instructions for restricting a fan-out search in a peer-to-peer network based on accessibility of nodes.

2. Description of Related Art

The amount of Internet content continues to grow rapidly and to outpace the ability of search engines to index the exploding amount of information. The largest search engines cannot keep up with the growth as it has been estimated that search engines only index about 5% to 30% of the information content on the Web. Hence, at the current time, the majority of Web content is not classified or indexed by any search engine.

There are currently two broad categories of systems which provide the service of categorizing and locating information on the Web: (1) search engines that return direct hits to sites containing data that match inputted queries, such as AltaVista; (2) Web portals that organize the information into categories and directories, such as Yahoo!. These systems operate using a traditional client-server model with packet-switched data interchange.

Recently, the traditional Web client-server paradigm has been challenged by distributed content-sharing or file-sharing systems that support a peer-to-peer model for exchanging data. In peer-to-peer networks, each computer platform, or node, can operate as a hub, i.e., each node has both client functionality and server functionality. Each node has a list of addresses, most commonly Internet Protocol (IP) addresses, of several other nodes, or "peer nodes". These nodes can directly communicate with each other without a central or intermediate server.

Nodes within a peer-to-peer network form a distributed file-sharing system in which the nodes act cooperatively to form a distributed search engine. When a user at a node enters a search query, the search query is copied and sent to its list of peer nodes. Each peer node searches its own databases in an attempt to satisfy the search query. Each node copies the query to each node in its list of peer nodes while observing a time-to-live value in the query message. If a resulting query hit is made, then the node returns some type of query results to the originating node. The search quickly fans out amongst a large number of nodes, which provides a useful manner for finding new content that has not yet been indexed by the large search engines.

In a peer-to-peer data sharing network, each node participates in a process of connecting and disconnecting with other nodes. When a connection is established with another node, a user cannot quickly determine whether or not it is worth browsing the content of the newly connected peer node. Since the search might fan out within a widely distributed network, the search can often reach nodes that do not contain any content that would be of interest to the user.

In a peer-to-peer network, a search originated by one node fans out to other nodes. This fan out may occur in an exponential manner depending on the connectivity of the nodes to which the message for the search reaches. In some cases, a target node reached in a search may be behind a firewall. Such a target node is not of any use to the node originating the search request because even if the node contains data corresponding to the search, the originating node may be unable to pull that data from the target node behind the firewall. Data is pulled when a first node requests the data from a second node to cause the second node to send the data to the first node.

SUMMARY OF THE INVENTION

The present invention provides a method, apparatus, and computer implemented instructions for restricting a fan-out type search of a distributed database. A search request is received indicating that a requesting node originating the search request desires to avoid receiving search results including inaccessible nodes. Responsive to receiving the search results from other nodes, the search results are filtered to remove search results from inaccessible nodes to form filtered search results. The filtered search results are passed to the requesting node.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a high-level flowchart of a process for restricting a fan-out search in accordance with a preferred embodiment of the present invention;

FIG. 9 is a flowchart of a process for generating a search request in accordance with a preferred embodiment of the present invention;

FIG. 10 is a flowchart of a process for processing a search request in accordance with a preferred embodiment of the present invention; and FIGS. 11A-11B are flowcharts of a process for restricting a fan-out search to accessible nodes in accordance with a preferred embodiment of the present invention.

DETAILED DESCRIPTION OF THE PREFERRED EMBODIMENT

Figure 1:
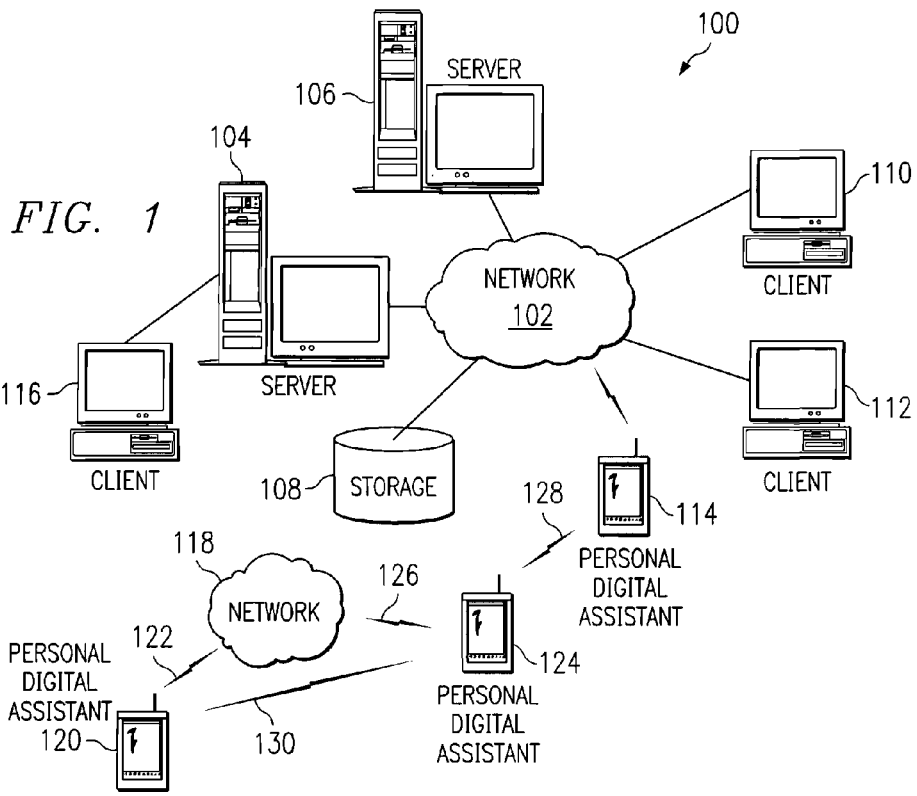
FIG. 1 is a diagram of a data processing system in which the present invention may be implemented in accordance with a preferred embodiment of the present invention.

With reference now to the figures and in particular, with reference to FIG. 1, a typical network data processing system 100 is depicted in which the present invention may be implemented. Network data processing system 100 contains network 102, which is a medium that may be used to provide communications links between various devices and computers connected together within network data processing system 100. Network 102 may include permanent connections, such as wire or fiber optic cables, or temporary connections made through telephone or wireless communications. In the depicted example, server 104 and server 106 are connected to network 102 along with storage unit 108. In addition, clients 110-114 also are connected to network 102. Clients 110-114 and servers 104-106 may be represented by a variety of computing devices, such as mainframes, personal computers, personal digital assistants (PDAs), etc. Network data processing system 100 may include additional servers, clients, routers, other devices, and peer-to-peer architectures that are not shown.

In the depicted example, network data processing system 100 may include the Internet as part of network 102. The Internet includes a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), and Wireless Application Protocol (WAP).

Of course, network data processing system 100 also may include a number of different types of networks, such as, for example, an intranet, a local area network (LAN), or a wide area network (WAN). For example, server 104 directly supports client 116 and network 118, which incorporates wireless communication links.
Network-enabled phone 120 connects to network 118 through wireless link 122, and PDA 124 connects to network 118 through wireless link 126. Phone 120 and PDA 124 also may directly transfer data between themselves across wireless link 130 using an appropriate technology, such as Bluetooth™ wireless technology, to create so-called personal area networks (PAN) or personal ad-hoc networks. In a similar manner, PDA 124 can transfer data to client 114, a PDA, via wireless communication link 128.

The present invention could be implemented on a variety of hardware platforms; FIG. 1 is intended as an example of a heterogeneous computing environment and not as an architectural limitation for the present invention.

Figure 2:
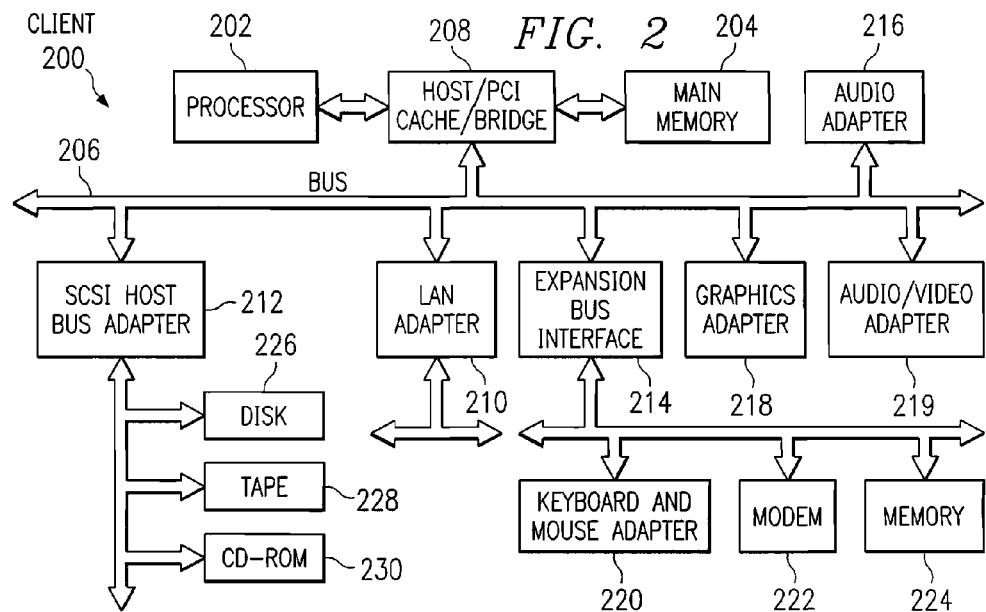
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

Figure 3:
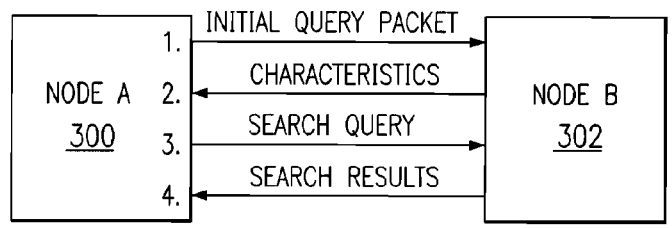
FIG. 3 is a block diagram illustrating an Internet based connection between two nodes in accordance with a preferred embodiment of the present invention.

Turning next to FIG. 3, a block diagram illustrating an Internet based connection between two nodes is depicted in accordance with a preferred embodiment of the present invention. Node 300 and node 302 may be implemented using a data processing system, such as data processing system 200 in FIG. 2. These two nodes communicate with each other through an Internet service provider (ISP), not shown in this example. Users of node 300 and node 302 may employ browsers and other network applications, such as a peer-to-peer sharing application, to send and receive information across a network. In this example, node 300 may send a query packet to node 302 to obtain characteristics of node 302. In response to receiving this packet, node 302 returns characteristics. Thereafter, node 300 may send a search query to node 302. In response, a set of search results may be returned to node 300 from node 302. As part of the search, node 302 may forward the search to other nodes if data matching the search query is absent. Results returned from those nodes are received by node 302 and returned to node 300 as part of the search results.

Figure 4:
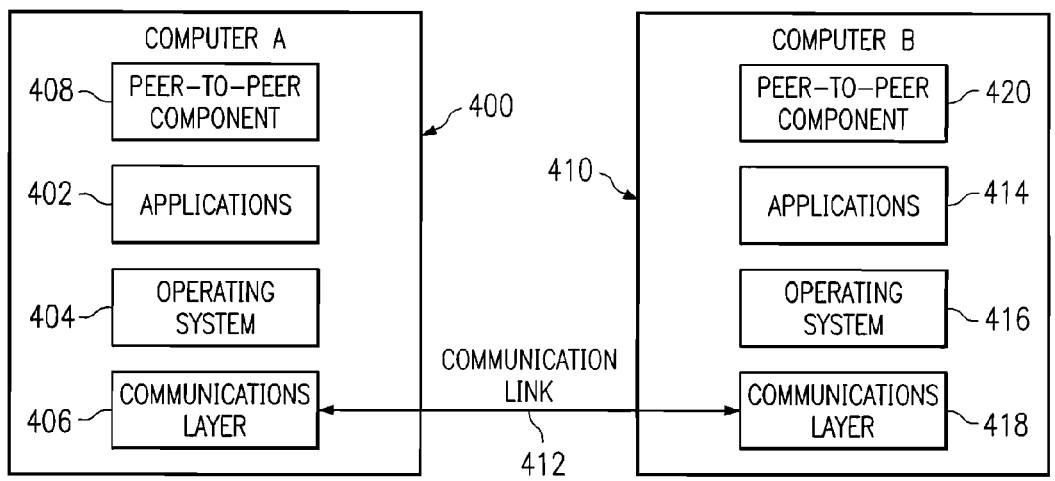
FIG. 4 is a block diagram of software components within two computers, operating as nodes within a peer-to-peer network, in accordance with a preferred embodiment of the present invention.

With reference now to FIG. 4, a block diagram of software components within two computers, operating as nodes within a peer-to-peer network, are depicted in accordance with a preferred embodiment of the present invention. Computer 400 has network-enabled applications 402 that use operating system 404 for various services, such as network communication services provided by communications layer 406. In addition, peer-to-peer component 408 may be a stand-alone applet or an application that provides peer-to-peer networking functionality to computer 410. Communication link 412 supports data traffic between computer 400 and computer 410, which has software components that correspond to those shown in computer 400: applications 414, operating system 416, communications layer 418, and peer-to-peer component 420. Peer-to-peer components 408 and 420 may provide support for a distributed, peer-to-peer file sharing function, as shown in more detail in FIG. 5.

Figure 5:
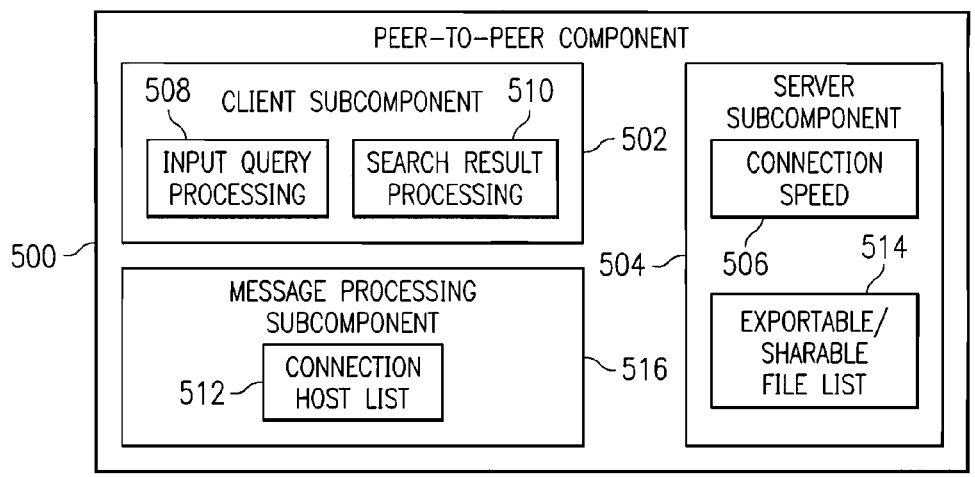
FIG. 5 is a block diagram of typical software subcomponents within a peer-to-peer software component, containing file sharing functionality in accordance with a preferred embodiment of the present invention.

With reference now to FIG. 5, a block diagram of typical software subcomponents within a peer-to-peer software component, containing file sharing functionality, is depicted in accordance with a preferred embodiment of the present invention. As noted previously, in peer-to-peer networks, each computer platform, or node, can operate as a hub, i.e., each node has both client functionality and server functionality. Peer-to-peer component 500 contains client subcomponent 502 and server subcomponent 504.

The method by which nodes in a peer-to-peer network connect with each other may vary with the type of peer-to-peer network. Generally, a client is dynamically assigned an IP address by an ISP when the client connects to the ISP, so the IP address possibly changes with each client session. In some implementations, a peer-to-peer connection between nodes in a peer-to-peer network is initiated when a user at a node manually enters either a domain name or an IP address (and optionally a port number) of an application of another node that is known to support peer-to-peer networking. The peer-to-peer application then establishes a connection with the other node at the specified address as a starting point within the network. For example, applications using the Gnutella protocol operate in this manner. Gnutella nodes also exchange connection speed, such as connection speed 506, that describe the speed of the network connection that is being used by the node. It should be noted, however, that the present invention can be implemented on a variety of peer-to-peer networks and is not limited by the peer-to-peer protocol that is used by the file sharing applications.

Nodes within a peer-to-peer network can act as a distributed file sharing system in which the nodes act cooperatively to form a distributed search engine. Client subcomponent 502 contains input query processing function 508 and search result processing function 510. When a user at a node enters a search query, the search query is copied to a list of peer nodes to which the node is connected, such as connection host list 512.

When a node receives the query, its server component, such as server component 504, processes the query. Each peer node searches its own databases in an attempt to satisfy the search query. Alternatively, a user has previously specified a list of files that the user is willing to export or share, such as file list 514, and the server subcomponent searches this list to find one or more files that satisfy the search query. Alternatively, rather than searching through a list of file names, the application may search the node's permanent storage for content that matches the search query. Depending on certain parameters within the query message, the node also forwards the query, e.g., by using message processing subcomponent 516, to each node in its list of connected peer nodes. If a resulting query hit is made, then the node returns some form of query results to the peer node that contacted it or to the originating node. In this manner, the search quickly fans out amongst a large number of nodes.

Figure 6:
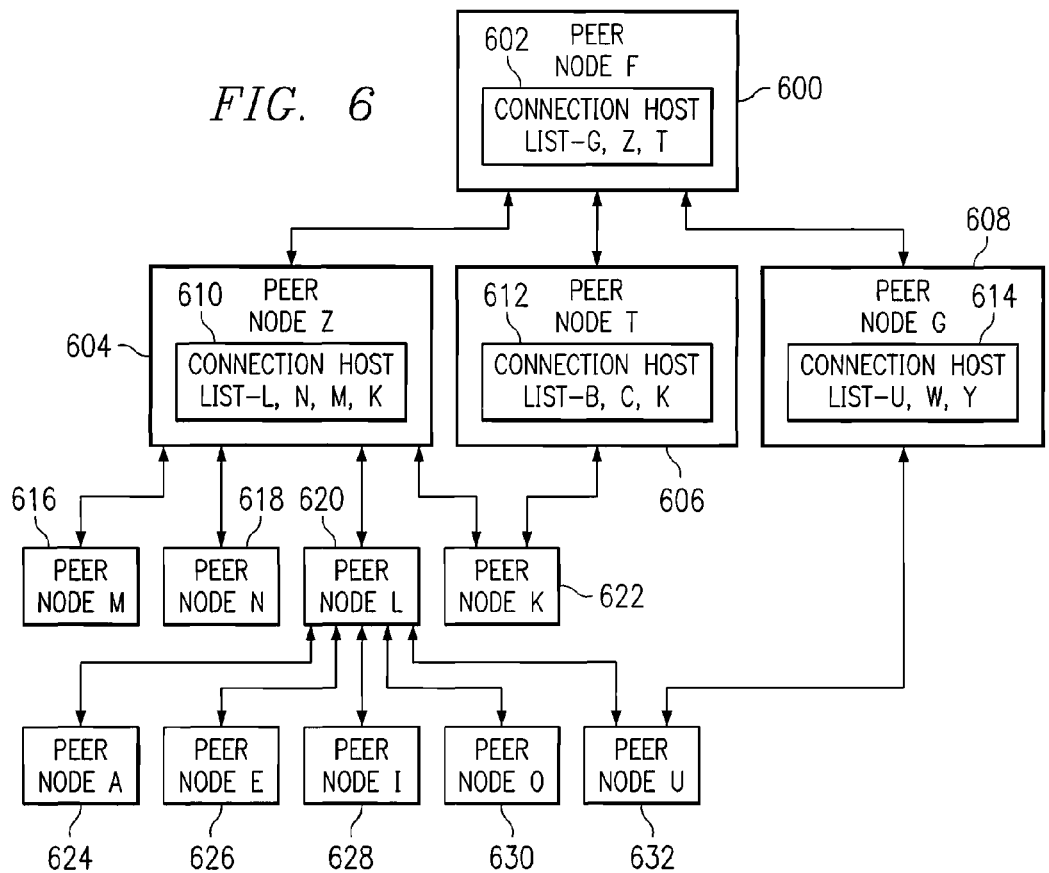
FIG. 6 is a block diagram of a typical network topology of nodes within a peer-to-peer network in accordance with a preferred embodiment of the present invention.

With reference now to FIG. 6, a block diagram of a typical network topology of nodes within a peer-to-peer network is depicted in accordance with a preferred embodiment of the present invention. Peer node 600 has a connection host list 602 that identifies nodes 604-608 to which peer node 600 is connected, and nodes 604-608 have their own connection host lists 610-614, respectively. In this example, node 604 connects to nodes 616-622, and node 620 connects with nodes 624-632;.

It should be noted that peer-to-peer networks do not have a structured topology, such as a strictly hierarchical organization amongst the nodes. In this example, node 606 also connects with node 622, and node 608 also connects with node 632. However, in order to distinguish immediately connected nodes from distant nodes, the set of nodes to which a particular node connects may be termed the "root nodes" of the particular node.

As noted above, the present invention is not limited to any particular peer-to-peer protocol that is used to implement the present invention. As background information, though, the Gnutella protocol is described in more detail as an example of the manner in which information may be passed in a peer-to-peer network between nodes that support a file sharing application. Reference may be made to the above description for FIG. 5 and FIG. 6 for components that would support file sharing within a peer-to-peer network using a protocol similar to Gnutella.

Gnutella is an Internet-based file searching/sharing program that combines both search engine functionality and file server functionality in a single application. When a user enters a search term into a Gnutella-enabled application at a node in the peer-to-peer network, a query message is generated with the appropriately formatted information, and the message is sent as a network packet to the user node's connected peers, i.e., peer nodes with which the user's node has already established a connection or session. Special codes within a Gnutella message header indicate the type of message, and each type of message has a unique code.

Any node within a certain distance from the user's node in the peer-to-peer network, i.e., within a certain node "hop count", will receive the query message; there is no mechanism to kill a query. As a query message moves through the connected nodes, a time-to-live (TTL) data field, which represents the hop count, is decremented. If the TTL field reaches zero, then the receiving node should not forward the query message, i.e., it should "drop the packet". Otherwise, the receiving node forwards the query message.

Each message contains a Globally Unique Identifier (GUID). When a new message is generated, a new GUID is also generated and placed within the new message. The manner in which the GUID is generated is not specifically specified by the Gnutella standard. When any message is received, the GUID is compared to a list of GUIDs, each of which were stored when its corresponding message was received. If the GUID is in the list, this fact indicates that the receiving node has seen this particular message previously because the GUIDs are supposed to be unique. Hence, if the GUID is in the list, then the node should not forward the received message because the receiving node's peer nodes would have also seen the message, and the packet can be dropped.

In addition, if the receiving node can fulfill the query, then the node creates a query hit (query reply) message and returns it to the node that originated the query message. The query hit message contains the address and port number of the responding node so that the originating node can send a message back to the responding node to retrieve a file if desired. The query hit message also contains the connection speed of the responding node and the number of search hits. For each query hit, the query hit message also contains the name of the file that satisfies the query and the size of that file. Other information may be included, such as length of the data content within the message, etc.

Assuming that the originating node has sufficient communication bandwidth, the results of the search should be received within a relatively short amount of time. The search results are stored or cached as they are received. The Gnutella-enabled application then presents the search results to the user in some fashion, and the user may select, through some type of user interface in the application, a filename that the user desires to retrieve. The application, which has stored the search results that include one or more nodes that responded with a search hit, can download a selected file to the user's node. Simple HTTP messages can be used for the download operation, such as a "Get", a "Put" message (for a Gnutella "Push" request).

The Gnutella protocol operates without a central server. Unlike typical search engines, Gnutella searches anonymously, and there is no index. There is also no authentication process nor authorization process. There are other types of messages within the Gnutella protocol, such as "Ping" and "Pong", for discovering other nodes on the network and for responding to "Ping" messages. Additionally, a "Push" request message allows a node within the network but behind a firewall to be contacted to push a file to the outside of the firewall rather than attempting to pull the file from inside the firewall. It should be noted that the Gnutella protocol specification is an open standard and is subject to modifications over time.

Figure 7:
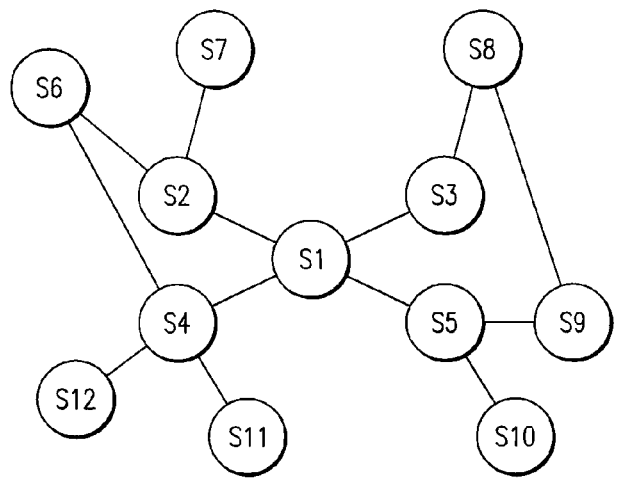
FIG. 7 is a block diagram illustrating data flow in a fan-out search in a peer-to-peer network in accordance with a preferred embodiment of the present invention.

Turning next to FIG. 7, a block diagram illustrating data flow in a fan-out search in a peer-to-peer network is depicted in accordance with a preferred embodiment of the present invention. In this example, network 700 is a peer-to-peer network that may be found within network data processing system 100 in FIG. 1. Each of these nodes in network 700 may be implemented using a data processing system, such as data processing system 200 in FIG. 2.

In this example, the search is initiated by node S1, which may fan out to nodes S11-S12 in two hops. For example, if node S1 initiates a search and a search hit occurs at node S9, a result is returned to node S1 through node S5. The identity of node S9, such as an IP address, is returned to node S1. Typically, if node S9 is behind a firewall, the IP address is of no use to node S1 if node S1 is unable to download data from S9.

Node S9 may be able to push data to S1 if node S1 allows data to be pushed to it. Alternatively, node S9 may also contain pointers to other nodes within network 700, which may contain data corresponding to the request and also are not behind a firewall.

The present invention provides a method, apparatus, and computer implemented instructions in which nodes participating in a peer-to-peer search send back in the initial exchange, information pertaining to whether they are located behind a firewall and if they permit the pulling of data if they are behind a firewall. Using the mechanism of the present invention, a node originating a search may use this information to prune or selectively filter the search results. Additionally, the mechanism of the present invention allows a node to modify a search to restrict the fan-out search to nodes that may be accessed using a pull system for retrieving data. Using this mechanism, search time for obtaining useful results may be reduced.

For example, node S1 receives a search request for a message specifying that node S1 only wants search hits from other nodes that are not behind a firewall. Node S1 does not contain a file corresponding to the search results and decides to forward the search request to node S2. Node S1 begins by sending a "ping" request to node S2. A "ping" request is made by a utility program and is designed to determine whether a particular IP address is online. According to the present invention, node S2 in addition to a normal reply to a "ping" request, also includes information as to whether node S2 is behind a firewall. This information is used by node S1 to decide whether it should forward the message containing the search request to node S2. In this example, the message is not sent to node S2 if node S2 is behind a firewall.

Referring next to FIG. 8, a high-level flowchart of a process for restricting a fan-out search is depicted in accordance with a preferred embodiment of the present invention. The process illustrated in FIG. 8 may be implemented in a node, such as node S1 in FIG. 7.

The process begins with a search request being sent to a connected node by a peer-to-peer data sharing application (step 800). This peer-to-peer data sharing application, may be, peer-to-peer component 408 in FIG. 4. The peer-to-peer data sharing application then receives a response from the connected node (step 802). After this occurs, node characterizing information is received from the response (step 804). The node characterizing information may be, for example, the speed of a peer node, current number of nodes connected to the node, current available bandwidth, when is a typically good time to connect to the node, a thumbnail sketch of information area within N links deep of the node, thumbnale characterstics of what areas the node covers, and the like. Search results are then formatted for display to a user based on user specified search filters (step 806), with the process terminating thereafter.

Turning now to FIG. 9, a flowchart of a process for generating a search request is depicted in accordance with a preferred embodiment of the present invention. The process illustrated in FIG. 9 may be implemented in a node, such as node S1 in FIG. 7.

The process begins by generating a request for a file (step 900). After this occurs, nodes are identified from a list (step 902). This list may be found in a data structure, such as connection host list 512 in FIG. 5. The request generated in step 900 is then sent to these identified nodes (step 904). After the request is sent to the nodes, results are received (step 906).

Next, a determination is made as to whether the file has been located (step 908). If the file has been located, a determination is made as to whether the file is located behind a firewall and does not allow data to be pulled (step 910). If the file is located behind a firewall and does not allow data to be pulled, a determination is made as to whether a push is allowed to obtain the file (step 912). A push occurs using push technology, which is a data distribution technology in which selected data is automatically delivered into the user's computer at prescribed intervals or based on some event that occurs. If a push is allowed to obtain the file, the file is requested (step 914), with the process terminating thereafter. Otherwise, the process terminates without requesting the file.

Referring back to step 910, if the file is not located behind a firewall or allows data to be pulled from behind the firewall, the file is pulled (step 916), with the process terminating thereafter. The pull occurs with the node generating a request for the file from the node identified as containing the file. Turning back to step 908, if the file has not been located, the process terminates. Of course, if the file is located in more than one node, the process would pull the file from a node that is accessible as opposed to one that is inaccessible.

Referring next to FIG. 10, a flowchart of a process for processing a search request is depicted in accordance with a preferred embodiment of the present invention. The process illustrated in FIG. 10 may be implemented in a node, such as node S1 in FIG. 7.

The process begins when a request for a file is received (step 1000). A determination is then made as to whether the file is present (step 1002). If the file is not present, nodes are identified for a search (step 1004). After these nodes are identified, the request is forwarded to the identified nodes (step 1006). Results are then received from these nodes (step 1008).

After the results have been received, the results are combined into a response (step 1010). Finally, the response is returned to the requester (step 1012), and the process terminates. Turning back to step 1002, if a file corresponding to a search is absent from a node, the process returns to step 1012, as described above.

Turning to FIGS. 11A and 11B, a flowchart of a process for restricting a fan-out search to accessible nodes is depicted in accordance with a preferred embodiment of the present invention. The process illustrated in FIGS. 11A and 11B may be implemented in a node, such as node S1 in FIG. 7.

The process begins by receiving a request for a file (step 1100). A determination is made as to whether the file is present within the node (step 1102). If the file is not present, nodes are identified for the fan-out search (step 1104). The identified nodes are "pinged" (step 1106). Thereafter, the process waits to receive a reply to the "ping" request (step 1108). A determination is then made as to whether a node returning a reply is behind a firewall and unable to allow data to be pulled (step 1110).

If a node is not behind a firewall, a determination is made as to whether replies from all nodes have been received (step 1112). If a reply has not been received from all of the nodes, a determination is made as to whether a timeout has occurred (step 1114). If a timeout has not occurred, the process returns to step 1108 and waits to receive a reply. In step 1110, if the node is behind a firewall and inaccessible, the node is marked for later processing (step 1116) with the process then returning to step 1112 as described above.

If a timeout has occurred, then the request is sent to the nodes replying to the "ping" request (step 1118). Step 1118 may send this request only to those nodes as being marked as not being behind a firewall and not allowing pulling of data. In this manner, the fan-out search may be restricted only to those nodes which are accessible. A node is accessible in these examples if data may be pulled from the node. The process then waits for results from the search request (step 1120).

When a result is received, a determination is made as to whether all results have been received (step 1122). If all of the results have been received, a response is generated using the results (step 1124). The response is then returned to the requestor (step 1126) with the process terminating thereafter.

With reference again to step 1112, if all the replies are received, the process returns to step 1118 as described above. Turning back to step 1102, if the file is present in the node, a response is generated identifying the file (step 1130) with the process then proceeding to step 1126 as described above.

Turning back to step 1122, if all the results have not been received, a determination is made as to whether a timeout has occurred (step 1128). If a timeout has occurred the process returns to step 1120. Otherwise, the process proceeds to step 1124 as described above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the mechanism of the present invention may be applied to all types of inaccessible nodes. A node may not be behind a firewall, but only allows data to be pushed. This type of node also may be one filtered out in the search. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing search requests in a peer-to-peer network, the method comprising:

responsive to an originating node generating a search request for a fan-out search sending the search request to a set of peer nodes, wherein a respective peer node in the set of peer nodes forwards the search request to other peer nodes in the set of peer nodes; and receiving search results resulting from the search request, wherein the search results comprises an identification of whether a given peer node containing data corresponding to the search request is an inaccessible node, and wherein the data corresponding to the search request is pulled from accessible nodes identified in the search results.

2. The method of claim 1, wherein the peer-to-peer network is located in at least one of an Internet, an intranet, a wide area network, and a local network.

3. The method of claim 1 further comprising:
selectively pulling the data corresponding to the search from accessible nodes identified in the search results.

4. The method of claim 1 further comprising:
selectively allowing the data corresponding to the search request to be pushed to the data processing system from an inaccessible node identified in the search results.

5. The method of claim 1, wherein the inaccessible node is a node behind a firewall.

6. A data processing system for processing search requests in a peer-to-peer network, the data processing system comprising a data processor coupled to a memory containing instructions that are operable to perform the following steps when executed by the data processor:
sending the search request to a set of peer nodes in response to an originating node generating a search request for a fan out search, wherein a respective peer node in the set of peer nodes forwards the search request to other peer nodes in the set of peer nodes; and
receiving search results resulting from the search request, wherein the search results comprises an identification of whether a given peer node containing data corresponding to the search request is an inaccessible node, and wherein the data corresponding to the search request is pulled from accessible nodes identified in the search results.

7. The data processing system of claim 6, wherein the peer-to-peer network is located in at least one of an Internet, an intranet, a wide area network, and a local network.

8. The data processing system of claim 6 further comprising:
selectively pulling the data corresponding to the search from accessible nodes identified in the search results.

9. The data processing system of claim 6 further comprising:
selectively allowing the data corresponding to the search request to be pushed to the data processing system from an inaccessible node identified in the search results.

10. The data processing system of claim 6, wherein the inaccessible node is a node behind a firewall.

11. A data processing system for processing search requests in a peer-to-peer network, the data processing system comprising a data processor coupled to a memory containing instructions that are operable to perform the following steps when executed by the data processor:
receiving a search request from an originating node;
sending the search request to a set of peer nodes identified by the data processing system, wherein a respective peer node in the set of peer nodes forwards the search request to other peer nodes in the set of peer nodes; and
receiving search results resulting from the search request from the set of nodes, wherein the search results identify whether a node within the set of nodes is an inaccessible node, and wherein the data corresponding to the search request is pulled from accessible nodes identified in the search results.

12. A computer program product comprising a non-transitory computer readable tangible storage device having program instructions stored thereon that are operable when executed by a data processor for processing search requests in a peer-to-peer network, the program instructions comprising:
first instructions for receiving a search request from an originating node;
second instructions for sending the search request to a set of peer nodes identified by a data processing system, wherein a respective peer node in the set of peer nodes forwards the search request to other peer nodes in the set of peer nodes; and
third instructions for receiving search results resulting from the search request from the set of nodes, wherein the search results identify whether a node within the set of nodes is an inaccessible node, and wherein the data corresponding to the search request is pulled from accessible nodes identified in the search results.

* * * * *